June 23, 1953 J. R. BRISSON ET AL 2,643,011
FRONT OR REAR-END TRUCK LOADER
Filed May 10, 1950 5 Sheets-Sheet 1

INVENTORS
WALTER O. BRISSON
JOHN R. BRISSON
LESLIE W. BRISSON
BY Young Wright
ATTORNEYS

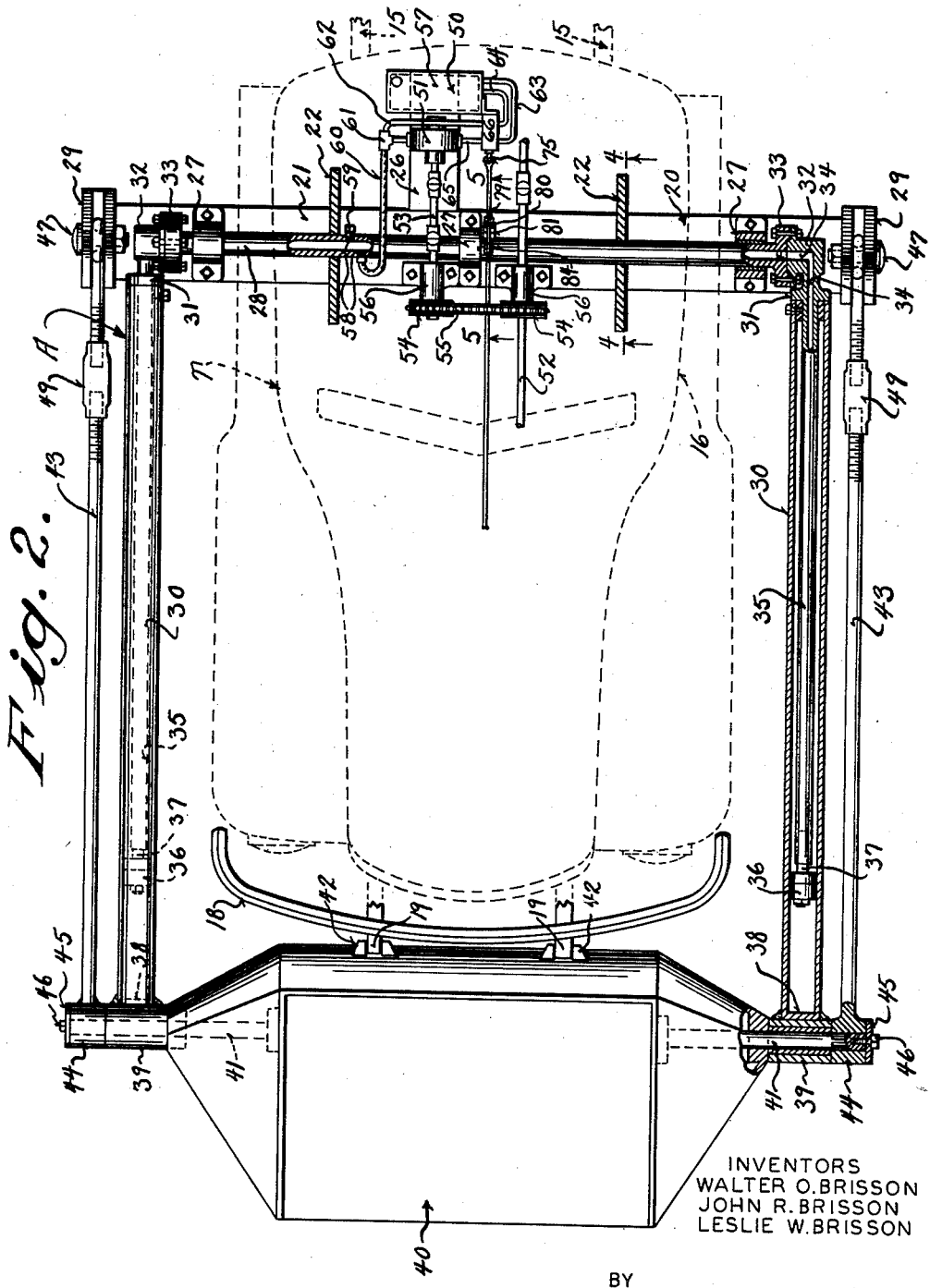

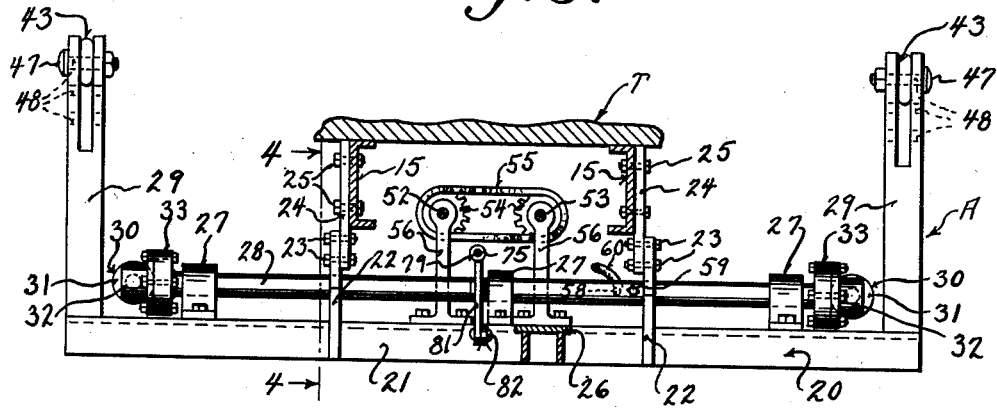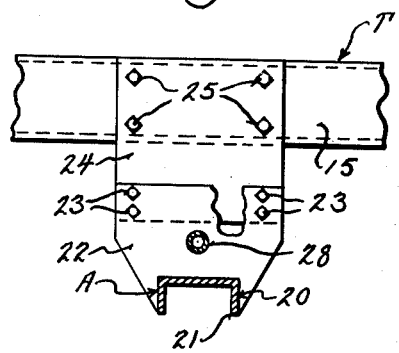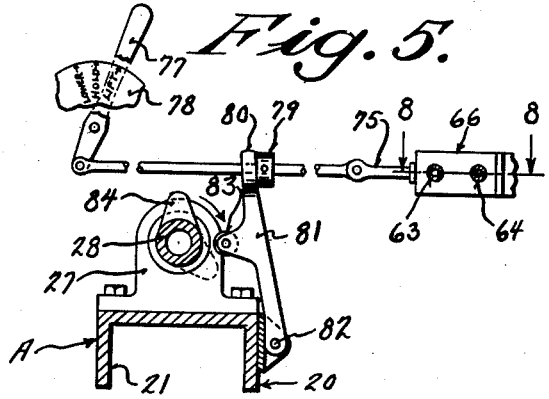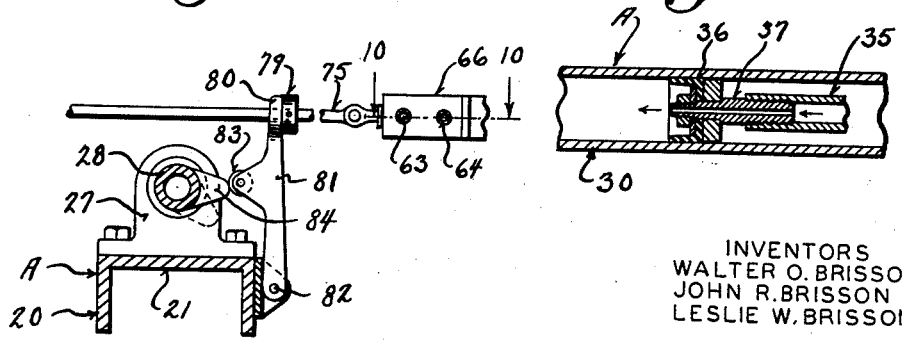

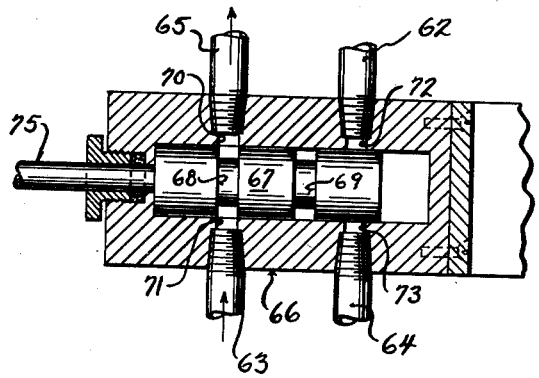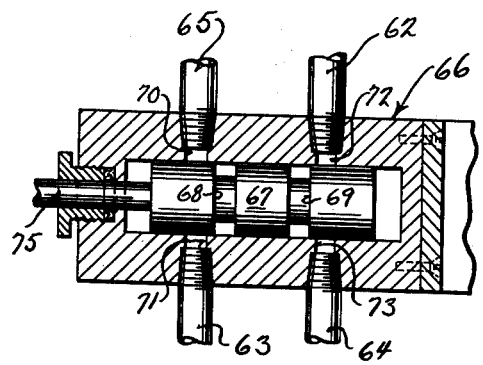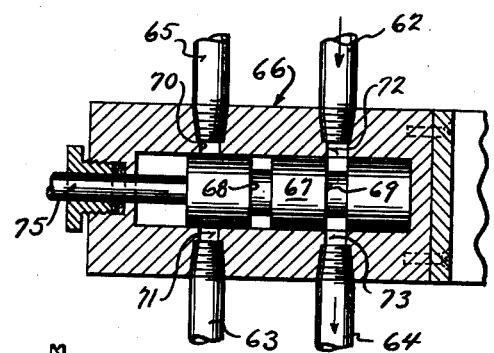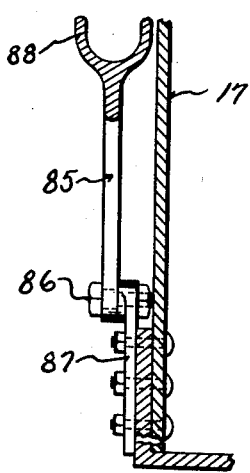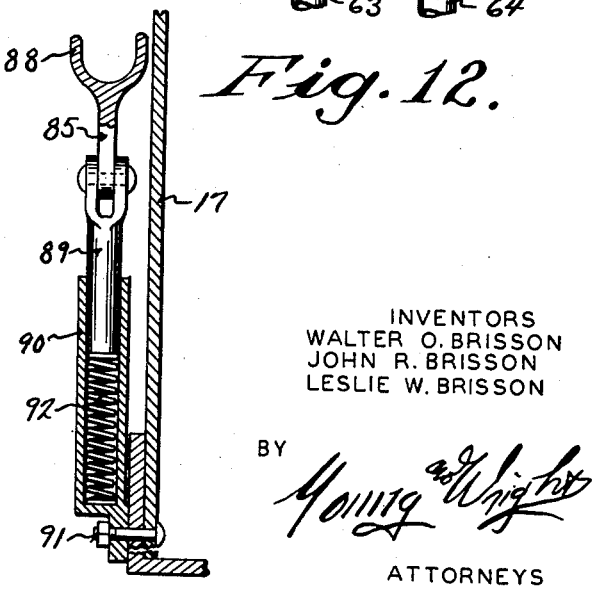

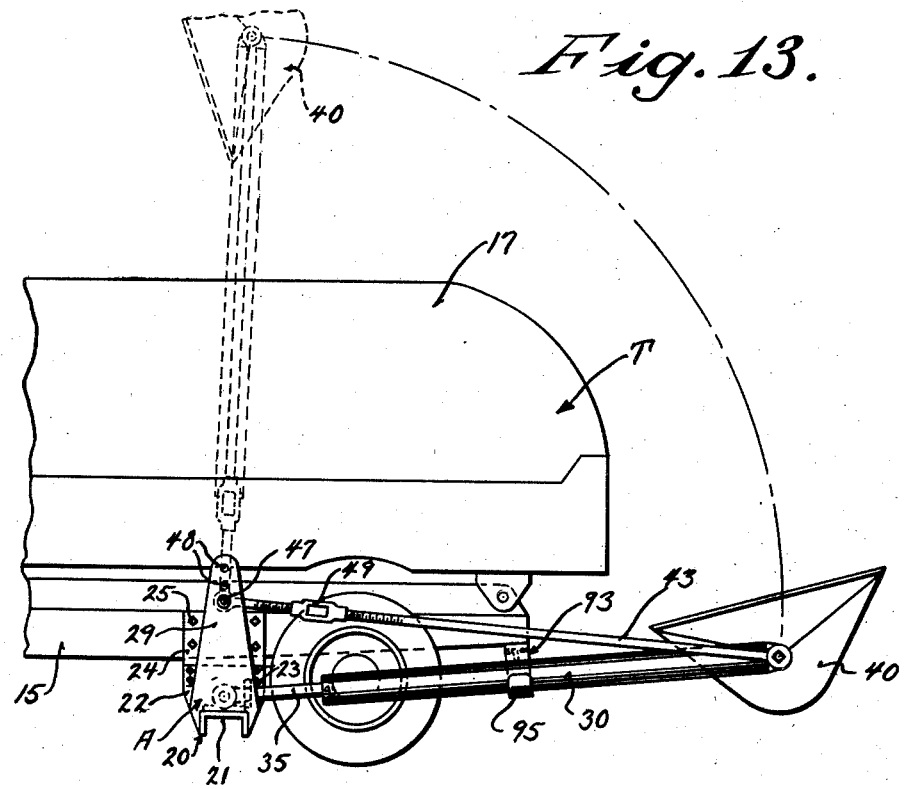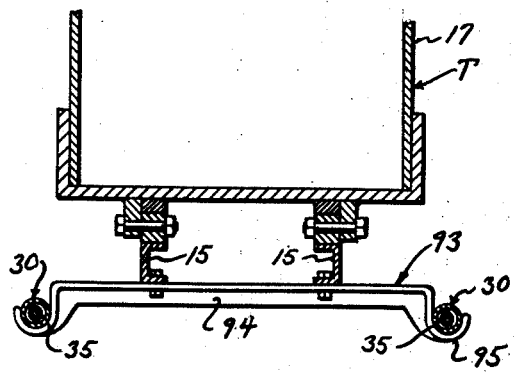

Patented June 23, 1953

2,643,011

UNITED STATES PATENT OFFICE 2,643,011

FRONT OR REAR-END TRUCK LOADER

John R. Brisson, Walter O. Brisson, and Leslie W. Brisson, Norway, Mich.

Application May 10, 1950, Serial No. 161,236

7 Claims. (Cl. 214—78)

This invention appertains broadly to material handling, and more particularly to a novel device for facilitating the loading of dump and other like trucks.

One of the primary objects of our invention is to provide a versatile loading attachment for standard dump and like trucks, which can be readily and easily selectively associated with either the front of the truck for both bucking into and receiving the load (snow, gravel, leaves, etc.) and then dumping the load into the truck body or the rear of the truck for receiving material (ashes, garbage, trash, etc.) from collection receptacles and then dumping the load into the truck body, the device being particularly useful for the dump trucks of small municipalities.

Another salient object of our invention is the provision of novel means for operating the material receiving bucket or scoop, which is of an exceptionally compact nature, so that the same will readily function on standard trucks without interfering with any of the truck parts or appurtenances.

Another important object of the invention is the provision of novel booms for raising and lowering the bucket or scoop which constitute cylinders for the hydraulic fluid, in combination with substantially fixed radius rods, the radius rods functioning in combination with the cylinders to transfer outward thrust of the cylinders into radial motion for raising and lowering the bucket or scoop. By using the loader booms as cylinders, not only is the construction of the unit simplified, but other advantages are obtained, such as, the mechanical force required to lift a given load is exerted as a thrust force against the radius rods by the boom cylinders and therefore permits the use of lighter materials in construction than would be required by cantilever type operated booms; second, a potential operating range of over 180° of rotation of the loader booms is possible, thus permitting the unit or attachment to be used from either the front or rear end of the vehicle as desired, with no change in mechanical leverage advantage from either end; third, the unit provides maximum leverage advantage when starting to lift from the ground with this leverage decreasing and the speed of motion increasing as the booms near the vertical position; fourth, with the boom cylinders the leverage advantage can be readily varied for different load weights by the mere relocating of the pivot trunnions for the radius rods; fifth, the attachment greatly simplifies mounting the unit on a vehicle since all parts of the unit are fastened to a stationary cross member which goes across under the vehicle, with no part of the loader moved down toward the ground during operation and thus providing constant ground clearance; sixth, since the arc of the loader bucket is the arc transscribed by the radius rods, the bucket can be mounted in closer relation to the vehicle; and seventh, the design gives a great range of leverage advantage relative to boom length.

A further important object of the invention is the provision of a hollow equalizer shaft for the two boom cylinders, and a novel and simple means for supplying hydraulic fluid under pressure to the shaft.

A still further important object of the invention is the provision of a novel and simple valve mechanism for controlling the flow of fluid to and from the cross shaft, with automatic means for operating the valve mechanism for cutting off the supply of fluid to the cross shaft and for establishing drainage communication between the cross shaft and the reservoir of the hydraulic system, as the booms and the bucket reach certain selected positions.

With these and other objects in view, the invention consists in the novel construction, arrangement and formation of parts, as will be hereinafter more specifically described and claimed, and illustrated in the accompanying drawings, in which drawings, Figure 1 is a side elevational view of a conventional dump truck, showing our novel attachment incorporated with the front end thereof, parts of the figure being shown broken away and in section to illustrate structural detail.

Figure 2 is an enlarged top plan view of the novel unit or attachment with parts thereof broken away and in section.

Figure 3 is a transverse sectional view taken on the line 3—3 of Figure 1, looking in the direction of the arrows, illustrating the mounting of the unit on the truck chassis and the position of the equalizing cross shaft relative to the supporting structure.

Figure 4 is a detail fragmentary vertical section taken on the line 4—4 of Figure 3, looking in the direction of the arrows, illustrating one of the hanger brackets utilized for connecting the unit or attachment to the vehicle chassis.

Figure 5 is a detail vertical sectional view illustrating the means for automatically operating the control valve for the hydraulic mechanism, the valve being in the position for supplying fluid from the pump to the equalizing cross shaft.

Figure 6 is a view similar to Fig. 5, but showing the valve in its hold or middle position.

Figure 7 is a fragmentary, longitudinal sectional view through one of the boom cylinders, illustrating the piston construction.

Figure 8 is an enlarged detail longitudinal sectional view through the control valve showing the same in its position for permitting the supplying of hydraulic fluid under pressure to the equalizing shaft, the section being taken on the line 8—8 of Figure 5, looking in the direction of the arrows.

Figure 9 is a view similar to Figure 8, but showing the valve in its closed or "hold" position.

Figure 10 is a view similar to Figures 8 and 9 and showing the position of the valve for permitting the draining of the fluid from the booms to the reservoir, Figure 10 being taken on the section line 10—10 of Figure 6, looking in the direction of the arrows.

Figure 11 is a detail, vertical sectional view taken on the line 11—11 of Figure 1, looking in the direction of the arrows, illustrating a part of one of the cushioning supports for the booms.

Figure 12 is a detail sectional view taken on the line 12—12 of Figure 1, looking in the direction of the arrows illustrating a further part of one of the cushioning supports for the booms.

Figure 13 is a fragmentary side elevational view of a conventional dump truck showing our attachment or unit connected to the rear thereof.

Figure 14 is a fragmentary transverse sectional view illustrating the support for the booms when the device is mounted on the rear of a truck.

Referring to the drawings in detail, wherein similar reference characters designate corresponding parts throughout the several views, the letter A generally indicates our novel loading attachment or unit for a conventional dump truck T.

Figure 1:
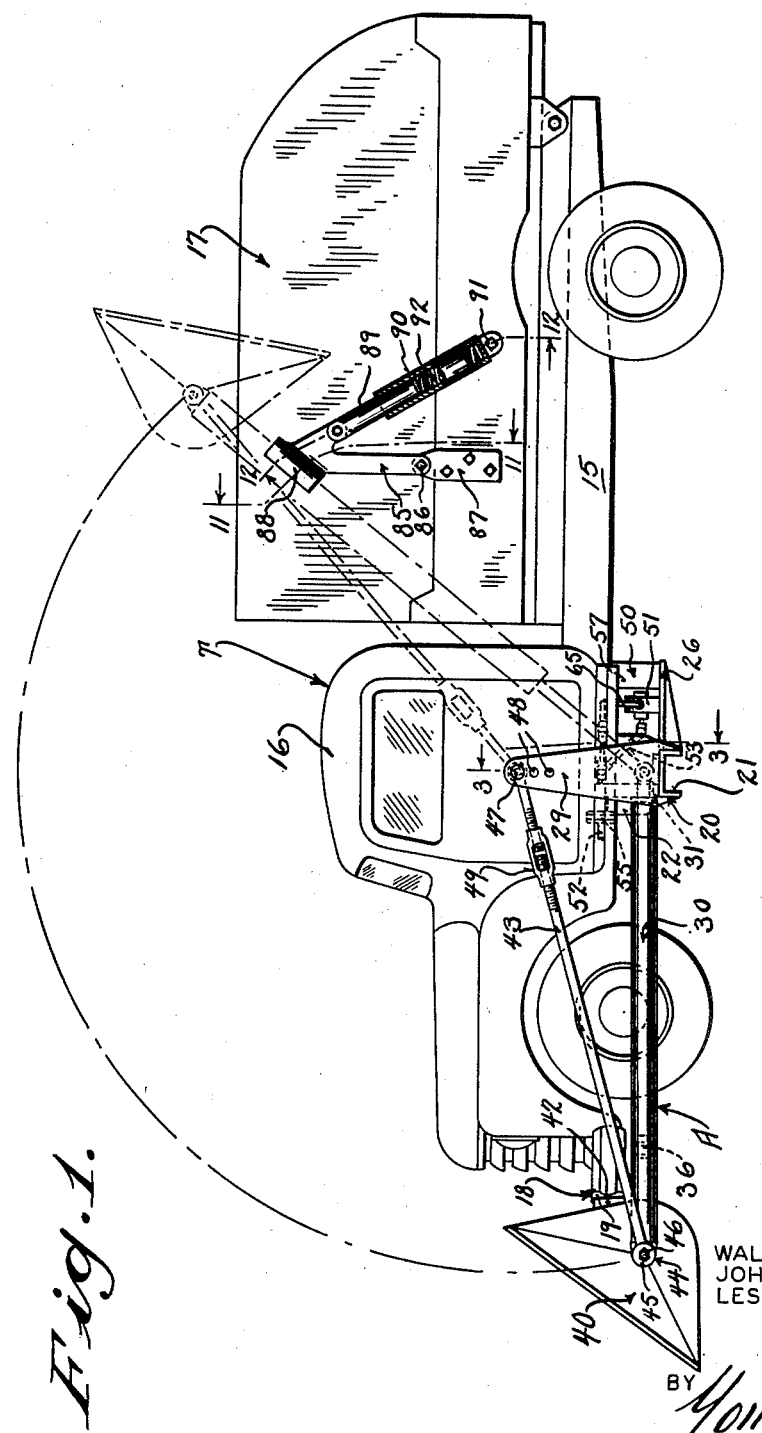

The truck T forms no part of the present invention, other than in combination with the attachment A, and hence the truck will not be described in detail. However, the truck T includes a wheeled chassis embodying longitudinally extending channel frame beams 15 on which is mounted the cab 16 and the dump body 17. The front of the truck can be provided with a bumper 18. In accordance with the invention, the bumper 18 is preferably provided with vertically disposed spaced guide ribs 19, the purpose of which will later appear.

The loading attachment or unit A includes an attaching and supporting structure 20, which embodies a transversely extending supporting beam 21. This beam extends under the truck and can be of a channel shape and the ends thereof protrude beyond the chassis and the sides of the body 17. Rigidly fastened to the beam 21, by welding or the like, are a pair of spaced, parallel anchor plates 22, and the plates 22 are in turn rigidly fastened in any suitable manner, such as by bolts 23, to fixture plates 24. These fixture plates 24 are rigidly, but detachably fastened, to the chassis beams 15 by removable bolts 25. Thus the supporting structure 20 can be readily and easily connected to the chassis by the bolts and can be also quickly detached from the chassis. Rigidly fastened to the transverse beam 21, is a supporting platform 26 for certain parts of the hydraulic system, which will be later set forth. The transverse beam carries at spaced points bearing brackets 27, and these bearing brackets rotatably support and carry the hollow equalizing cross shaft 28, which forms an important part of the loading mechanism, as will also later appear. The bracket plates 22 are provided with aligned apertures through which the equalizing cross shaft 28 passes. The ends of the transverse cross beam 21, which protrude beyond the sides of the truck have firmly and rigidly secured thereto, by welding or the like, upstanding rugged brackets 29.

Projecting forwardly of the transverse cross beam 21 are the boom cylinders 30, and these boom cylinders are connected with and carried by the equalizing cross shaft 28. The inner ends of the cylinders 30 have rigidly fastened thereto closure heads or caps 31, and these closure heads 31 are provided with inwardly directed right angularly extending fittings 32, which are firmly bolted or otherwise fastened to the enlarged ends 33 of the cross shaft 28. By referring to Figure 2, it can be seen that the end closure caps 31 and their extensions 32 are provided with internal passageways 34, which communicate with the interior of the hollow shaft. Extending longitudinally of the cylinder booms 13 are hydraulic fluid supply tubes 35 and these tubes 35 can be formed on the end caps 31, or rigidly connected with said end caps. The tubes 35 extend a material distance into the boom cylinders 30 and the forward ends thereof are provided with pistons 36, which snugly fit the inner walls of the boom cylinders 30. The pistons 36 are connected to the tubes 35, by means of a nozzle fitting 37, and it can be seen that hydraulic fluid can flow through the equalizer shaft into the tubing 35 and through the pistons 36 into the boom cylinders. In Figures 1 and 2, wherein we have illustrated our device attached to the front of the truck, the cylinder booms 30 extend forwardly of the truck and their front ends are closed by walls 38, and the front ends of the boom cylinders have rigidly fastened thereto transversely extending bearing sleeves 39.

In the form shown in Figures 1 and 2, a combination scoop and bucket 40 is provided, and the end walls of the scoop or bucket have rigidly fastened thereto outwardly extending stub shafts or trunnions 41. These stub shafts 41 rotatably extend through the bearing sleeves 39 of the booms and any desired type of anti-friction bearings can be interposed between the bearing sleeves 39 and the stub shafts 41. The rear wall of the scoop or bucket 40 is provided with pairs of guide tracks 42, which receive the guide ribs 19 on the bumper 18, when the scoop is in its completely lowered position. This relieves strain on the booms when the bucket 40 is utilized for picking up snow and the like.

The bucket 40 is of a particular type, so that the same can be successfully used on the front of a truck for picking up a load and bucking into the same. As illustrated in Figure 1, when the boom cylinders 30 are in their lowered position, the lower forward edge of the bucket is in a scraping or ground engaging position. Hence the loading device can be successfully used for picking up leaves, gravel, snow and the like, as will be later pointed out. Obviously, the guide tracks 42 receiving the guide ribs 19 on the truck bumper 18 give a rigid connection between the bucket 40 and the truck which will prevent lateral shifting of the bucket when the bucket is forced into the load. Likewise rearward pressure on the bucket will be transmitted through the bumper 18 to the chassis of the truck.

In conjunction with the cylinder booms 30, we utilize a radius rod 43 on each side of the attachment A and adjacent to each cylinder boom. The forward ends of the radius rods 43 terminate in hubs 44, and the hubs receive the outer terminals of the stub shafts or trunnions 41 and the hubs are rigidly connected to said stub shafts. As illustrated, the terminals of the stub shafts 41 can be provided with longitudinally extending keyways and the interior of the hubs can be provided with mating keys to fit in said ways. Lateral shifting of the radius rods on the stub shafts can be prevented in numerous ways, and as illustrated, washer plates 45 are fitted against the outer faces of the hubs and are held in place by machine screws 46, which enter into the stub shafts. The inner ends of the radius rods 43 are pivotally connected to the brackets 29, by means of trunnions 47. The upper ends of the brackets 29 are preferably bifurcated, so as to receive the inner ends of the radius rods to prevent lateral shifting thereof, and the brackets can be provided with a row of openings 48. The bearing trunnions 47 can be selectively fitted in the openings for varying the relative position of the inner ends of the radius rods 43 and the cylinder booms 30, for a purpose which will be hereinafter set forth. The radius rods can have incorporated therein turn buckles 49, so that the active length thereof can be adjusted.

The hydraulic means 50 for bringing about the raising and lowering of the bucket 40 will now be described. This hydraulic means 50 can include a rotary pump 51 driven from the power take off shaft 52 of the truck. The power take off shaft 52 can be operatively connected with the drive shaft 53 of the pump 51, in any desired way. As illustrated, the power take off shaft 52 is connected with the pump shaft 53, by means of sprockets 54, and a sprocket chain 55. The cross beam 21 can have secured thereto suitable bearing brackets 56 for supporting these shafts. The pump 51 can be mounted on the platform 26 and this platform can also support the reservoir 57 for the hydraulic fluid. The cross shaft 28 is provided at spaced points with inlet ports 58 and one of these ports can be closed by a plug 59. The port in use has communicating therewith a detachable flexible hose 60 communicating with a T coupling 61. The T coupling 61 is in communication with the outlet of the pump and this coupling 61 has also communicating therewith a return pipe 62. Leading from the reservoir 57 are feed and return pipes 63 and 64. The pump 51 has also communicating therewith a supply pipe 65. The pipes 62, 63, 64 and 65 all lead to a control valve casing 66. The valve casing 66 forms a part of the hydraulic unit and can be supported on the platform 26 in any desired way. For the purpose of illustration, we have shown the valve casing 66 carried by the reservoir 57. In view of the fact that we employ the cross equalizing shaft 28, a single simple valve structure can be utilized. Slidable (see Figures 8, 9 and 10) in the valve casing 66 is a slide valve body 67, and this body is provided at spaced points with annular ways 68 and 69. The valve casing 66 is provided with transversely aligned ports 70 and 71 and transversely aligned ports 72 and 73. Communicating with the outlet port 70 is the supply pipe 65 which leads to the T coupling 61, and communicating with the inlet port 71 is the feed pipe 63 leading from the reservoir. Communicating with port 72 is the return pipe 62 and communicating with the port 73 is the pipe 64 leading back to the reservoir 57. Rigidly connected to the valve body 67 is an operating rod 75 and this rod extends through a suitable stuffing box carried by the valve casing. The valve rod 75 is both manually and automatically operated, as will now be described. The extreme forward end of the valve rod 75 is operatively connected to a pivoted hand lever 77, which can be disposed at any desired point, such as in the truck cab 16. The lever 77 can travel over a face plate 78 and the face plate can have suitable indicia thereon indicating the position of the valve body 67 in the valve casing 66. Hence, the face plate 78 can be provided with the legends "Lower," "Hold," and "Lift." Adjustably, but rigidly, connected on the valve rod 75 is a stop collar 79 normally engaged by a yoke 80 formed on the upper end of an operating lever 81. This lever 81 is mounted for rocking movement, as at 82, on the transverse cross beam 21. Carried by the operating lever 81 intermediate its ends is an anti-friction roller 83 which is adapted to be engaged at certain times, as will be hereinafter described, by a cam 84 formed on or secured to the equalizing cross shaft 28.

Considering that our attachment A is secured in position on the front of the truck, as illustrated in Figure 1 and Figure 2, and described above, the operation is as follows: The truck is operated in the ordinary way and if a load is to be picked up, the truck is driven forwardly so as to force the bucket 40 into the material. After the desired quantity of material has entered the bucket, the operator actuates the hand lever 77 to the position indicated by the word "Lift" on the face plate 78 and the valve body 67 will be moved forwardly in the casing 66 to bring the annular way 68 into registration with the ports 70 and 71. The inner end of the valve body will close the ports 72 and 73. As the pump 51 is being operated from the power take off shaft 52, fluid will be drawn in from the reservoir 57 through pipe 63, past ports 71 and 70 through pipe 65, T coupling 61, hose 60 and into the equalizing cross shaft 28. This liquid under pressure will then flow into the boom cylinders 30 through the piston sleeves 35 and pistons 36 and the fluid will be confined between the pistons 36 and the boom walls 38. This causes the boom cylinders 30 on each side of the truck to thrust outward. The radius rods 43 transform this thrust force of the boom cylinders into radial motion, causing the booms to lift upwardly. The rear trunnions 47 are the center of the axis of rotation and the stationary brackets 29 provide the mounting fulcrum to which the rear ends of the radius rods are attached, as heretofore described. As the booms 30 lift and approach the vertical, their leverage decreases and the motion accelerates to a point at the vertical when the radius rods 43 are parallel to the boom cylinders and all rotating leverage is gone. At this point, the cam 84 (see Figure 6) engages the roller or cam follower 83 and moves the lever 81 to the right (Figure 6). As the booms and radius rods approach the vertical, the pump is cut off, as shown in Figure 9, and the annular ways 68 and 69 are out of alignment with the ports 70, 71, 72 and 73 and the bucket swings over this vertical or dead center position through its inertia. In this way the operator can stop his bucket very shortly over the dead center point of the boom cylinders if he so desires. By the same token, he can continue to lower the booms on toward the back by merely pushing the valve control lever 77 forward himself after he has felt the cam lobe 84 force the lever 77 into the middle, hold position. This assures complete operator control at all times and prevents an accidental dropping of the load too far back. When the operator moves the lever 81 to its extreme position to the rear and the body 67 assumes the position shown in Figure 10, with the annular way 68 in communication with the ports 72 and 73, and with the ports 70 and 71 remaining closed, fluid can now flow back from the booms through the equalizing shaft 28 through hose 60, T coupling 61, pipe 62, ports 72 and 73, return pipe 64 to the reservoir 57, and hence the bucket can continue its backward movement forcing the oil to the reservoir and the load will be dropped into the truck.

To bring the booms 30 and the bucket back to the ground, the operator moves his hand lever 77 to the position marked "Raise" on the face plate 78 and the valve body 67 will be moved forwardly to the position shown in Figure 8 with the annular ways 68 in communication with the ports 70 and 71, and the oil will be forced back into the boom cylinders, causing them to move back through the top dead center point and when this point is reached the cam 84 will again operate the lever 81 to force the valve body 67 to the right and to the position shown in Figure 9, preventing further flow of oil to the cylinders and the inertia of the bucket will cause the same to swing past the vertical and back to its forward down position.

Where it is desired to move the bucket to a limited raised position to engage an intermediate portion of a pile of material, the operator can initially move his hand lever 77 to the word "Lift" on the face plate and the valve body will establish communication between the ports 70 and 71. As soon as the bucket reaches the desired elevation, the lever 77 is shifted to the point marked "Hold" on the face plate and the valve body will then be in the position, shown in Figure 9, with all of the ports cut off. As the fluid cannot escape from the boom cylinders the bucket can be rigidly held in this selected position.

The cross equalizing shaft 28 with the booms fastened securely to it at each end equalizes the difference in load that might be imposed on one boom or the other. The shaft, being hollow, is utilized to provide the oil passageways from the pump to the two boom cylinders 30 and thus all exposed oil tubes (outside of the valve casing tubes) are eliminated.

During the travel of the truck and the non-use of the bucket 40, the same can be swung to its dumping position and carried over the truck, as shown in the dotted line position in Figure 1. Brackets 85 can be positioned on the sides of the truck body 17 for supporting the booms over the truck body and these brackets are constructed in a novel manner so as to eliminate shock, when the booms and bucket are moved back over the truck body during the dumping of the load. Hence, these brackets 85 are in the nature of levers and the lower ends thereof are pivoted as at 86 to fixtures 87 rigidly secured to the truck body. The upper ends of the lever brackets 85 have formed thereon rests 88 which receive the booms. Pivotally connected to the lever brackets 85 adjacent to their upper ends are downwardly and rearwardly extending pistons 89. These pistons are received in cylinders 90, which are in turn pivoted, in spaced relation to the fixtures 87, to the truck body 17, as at 91. Relatively heavy expansion coil springs 92 are disposed in the cylinders 90 and when the pistons 89 are forced back and down by the engagement of the booms with the brackets 85, the springs 92 effectively take up shock.

Much stress is laid on the fact that a single transverse cross beam 21 is utilized for supporting the various parts and that the cross beam is only secured to the truck by two attaching plates.

As brought out in the objects of the specification, one of the important features is that our device can be either arranged at the front of the truck or at the rear of the truck and this is easily accomplished by merely detaching the cross beam with its associated parts from the truck chassis and turning the entire attachment around so that the booms are projecting toward the rear of the truck. To bring this about, the attaching plates 22 are fastened to the chassis beam 15 at the cross points so that the extreme outer ends of the booms will be positioned at the correct distance relative to the rear of the truck. It is preferred to use the same bucket 40, but obviously, a different type of bucket can be provided, as when the device is mounted on the rear of the truck the bucket is not utilized for engaging the material and the material is dumped into the bucket from collection receptacles. When the device is mounted on the rear of the truck, the truck is then utilized for collecting garbage, ashes, trash and the like, from house to house, and the collection men merely dump the material into the bucket. As the bucket is at a convenient height, all work of climbing into the truck and dumping the material over the truck body is eliminated.

When the truck is utilized as a collection vehicle, the bucket is held above the ground as heretofore stated, and consequently, we prefer to use a support 93 for holding the boom arms 30 and the bucket at the desired position above the ground. This support can consist of a transverse cross brace 94 rigidly secured to the chassis beams 15 of the truck and the terminals of the cross brace 94 are provided with hooks 95 in which the booms 30 rest. When the device is disposed at the rear of the truck, the same is operated in exactly the same way as when the same is mounted on the front of the truck and to eliminate the twisting of the hose 60 around the cross equalizing shaft 28 the hose is connected with the most convenient opening 58 formed in said cross shaft.

The device is adapted particularly to be used with a dump truck, and we have not shown the mechanism for raising and lowering the body 17, but it is to be understood that the power take off shaft 52 actuates the fluid pump for the dump truck lift mechanism in the ordinary way.

Changes in details may be made without departing from the spirit or the scope of this invention, but what we claim as new is:

1. A loading attachment adapted to be associated with either the front or rear of a motor vehicle of the type having a chassis and a body, comprising a cross beam extending under the chassis, means detachably securing the cross beam to the chassis, upright brackets rigidly secured to the ends of the cross beam, a hollow equalizing cross shaft rotatably mounted on the beam, cylinder booms rigidly secured to the cross shaft for movement therewith having communication with the interior of the cross shaft, a bucket disposed between the outer ends of the boom cylinders, stub shafts on the ends of the bucket rotatably supported by the booms, radius tie rods pivotally connected at their inner ends to the brackets, means rigidly connecting the outer ends of the radius tie rods to the stub shafts, and means for forcing liquid under pressure to the boom cylinders through the equalizing cross shaft.

2. A loading attachment for motor vehicles as defined in claim 1 in which the means for forcing fluid to the equalizing cross shaft embodies a pump, a reservoir for fluid and a single slide valve mechanism for establishing communication between the reservoir pump and equalizing shaft for establishing a return communication between the equalizing shaft and the reservoir and for cutting off the return of fluid from the equalizing shaft to the reservoir and the supply of fluid from the pump and reservoir to the equalizing shaft.

3. A loading attachment for motor vehicles as defined in claim 2, means for manually operating the valve, and means for automatically operating the valve from the equalizing cross-shaft according to the position of the equalizing cross shaft and the bucket.

4. A loading attachment adapted to be secured to either the front or rear ends of a motor vehicle of the type having a chassis and a body, comprising a cross beam disposed transversely of the chassis, means for securing the cross beam to the chassis, upright bracket arms secured to the cross beam, a hollow equalizing cross shaft rotatably mounted on the beam, lift booms rigidly secured to the cross shaft for movement therewith communicating with the interior thereof, a loading bucket rotatably carried by the forward ends of the booms, radius tie rods adjustably connected to the brackets having their forward ends connected with the forward ends of the booms, means for supplying fluid under pressure to the booms through the equalizing cross shaft, means for automatically cutting off the supply of fluid to the cross shaft and booms when the booms reach a vertical position, and means for permitting the draining of fluid from the booms when the booms move past a vertical position.

5. A loading attachment for motor vehicles as defined in claim 4 and manually operable means for controlling the supply of fluid to the booms when the booms are past a vertical position.

6. A loading attachment for motor vehicles having a chassis and a body, comprising a hollow equalizing cross shaft, means rotatably supporting the cross shaft on the truck chassis, a pair of boom cylinders secured to the cross shaft for movement therewith and communicating with the interior thereof, a bucket carried by the outer ends of the boom cylinders, radius tie rods coupled with the outer ends of the boom cylinders, means pivotally supporting the inner ends of the radius tie rods above the cross shaft, means for supplying fluid under pressure to the equalizing cross shaft including a reservoir, a pump and a control valve, means for manually operating the control valve, and means for automatically operating the control valve including a cam on said shaft, a pivoted lever operatively connected to the valve and a follower on said lever disposed in the path of the cam.

7. A loading attachment for motor vehicles having a chassis, comprising a transversely extending cross equalizing shaft of a hollow construction, means rotatably supporting the shaft on the chassis, a pair of hollow boom cylinders secured to the shaft for movement therewith having communication with the interior thereof, a bucket carried by the outer ends of the boom cylinders, radius tie rods coupled with the outer ends of the boom cylinders, means pivotally connecting the inner ends of the tie rods to the chassis above the cross shaft, means for supplying hydraulic fluid under pressure to the hollow shaft including a reservoir, a pump and a control valve including a casing and a slide valve body, a valve rod secured to the valve body, a hand lever operatively connected to the rod for shifting the valve to selected positions for controlling the flow of fluid from the reservoir through the pump to the shaft, for cutting off the flow of fluid from the pump to the shaft and for establishing communication between the shaft and the reservoir, and means for automatically operating the valve body when the booms are in certain positions including a cam secured to the shaft, a pivoted lever operatively connected to the valve rod and a follower on the lever disposed in the path of the cam.

JOHN R. BRISSON.
WALTER O. BRISSON.
LESLIE W. BRISSON.

References Cited in the file of this patent

UNITED STATES PATENTS

| Number | Name | Date |
| --- | --- | --- |
| 1,356,149 | Hubback | Oct. 19, 1920 |
| 1,947,264 | Johnson et al. | Feb. 13, 1934 |
| 2,296,085 | Boldt | Sept. 15, 1942 |
| 2,348,899 | Guignard et al. | May 16, 1944 |
| 2,387,687 | Smith | Oct. 23, 1945 |
| 2,441,591 | Owen | May 18, 1948 |
| 2,456,491 | Collins | Dec. 14, 1948 |
| 2,470,778 | Lankovski et al. | May 24, 1949 |
| 2,488,699 | Anthony | Nov. 22, 1949 |
| 2,489,629 | Ford | Nov. 29, 1949 |
| 2,498,144 | Thomas | Feb. 21, 1950 |

FOREIGN PATENTS

| Number | Country | Date |
| --- | --- | --- |
| 118,679 | Australia | May 7, 1943 |